No. 804,892. PATENTED NOV. 21, 1905.
J. M. SMALL.
PROTECTIVE TREAD FOR PNEUMATIC TIRES.
APPLICATION FILED FEB. 6, 1905.
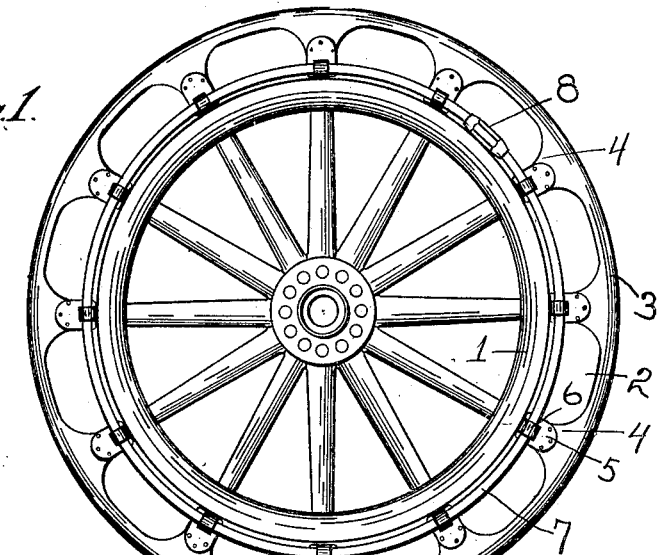
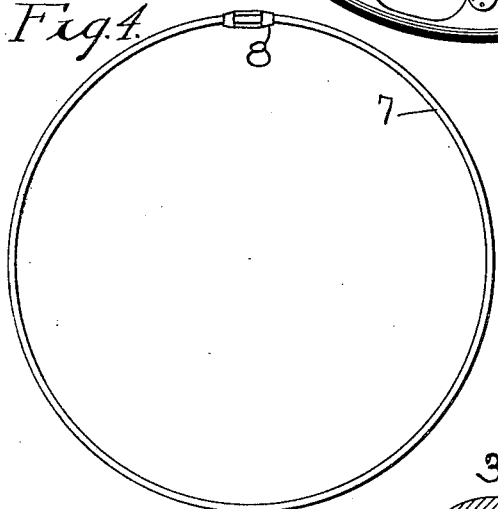
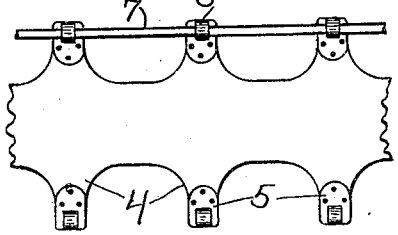
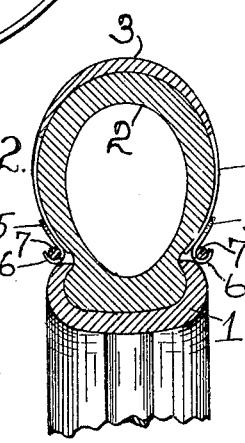

UNITED STATES PATENT OFFICE.

JAMES M. SMALL, OF PIQUA, OHIO.

PROTECTIVE TREAD FOR PNEUMATIC TIRES.

No. 804,892.     Specification of Letters Patent.     Patented Nov. 21, 1905.

Application filed February 6, 1905. Serial No. 244,287.

*To all whom it may concern:*

Be it known that I, JAMES M. SMALL, a citizen of the United States, residing at Piqua, in the county of Miami and State of Ohio, have invented certain new and useful Improvements in Protective Treads for Pneumatic Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in tire-protectors, and is designed to protect pneumatic tires of automobiles.

The object of the invention is to provide simple and efficient means for securely maintaining the protector in position upon the tire.

Preceding a detail description of the invention, reference is made to the accompanying drawings, of which—

Figure 1 is an elevation of a wheel having my tire-protector in position thereon. Fig. 2 is an enlarged cross-sectional view through the rim, tire, and protector. Fig. 3 is a detail detached view of a portion of the protector and one of the fastening-bands. Fig. 4 is a detached view of one of the fastening rings or bands.

In a detail description of the invention similar reference characters indicate corresponding parts.

The wheel-rim 1 is of suitable construction to receive the pneumatic tire 2, which is united therewith by any of the well-known ways. The outer surface of this pneumatic tire is covered with a tread-protector 3, which is of any suitable construction and of a suitably non-elastic nature—for example, a fabric constructed of canvas and rubber combined, leather, or other material. Projecting from both edges of this protecting-tread 3 is a series of side straps or tongues 4, which extend in uniform positions and distances adjacent to the rim of the wheel. These tongues or straps have fixed to them metallic plates 5, which terminate in outward hooks 6, the said hooks lying adjacent to the rim of the wheel, as shown in Fig. 1. Engaging these hooks on each side of the rim is a metallic ring or band 7, constructed of suitable round wire and having its ends inserted in a turnbuckle 8, by means of which the tread-protector 3 is uniformly tightened against the pneumatic tire and is held firmly in such position with the hooks lying snugly within the space between the rim and the tire. These tightening bands or rings 7 lie snugly against the tire and adjacent to the rim 1 and are not exposed to contact with any object that might have a tendency to interfere with the efficiency of the fastening devices. The rings or bands may be connected with one or more turnbuckles. It will be readily seen that in turning said buckle or buckles a uniform tension is given the tread-protector to hold it securely in position at all points, and the strain upon the tire is very greatly relieved.

The simplicity of the device and facility with which it may be placed in position and removed is one of the great advantages.

Having described my invention, I claim—

In a protective tread for pneumatic tires, the combination with a wheel-rim and the pneumatic tire, of a tread-protector consisting of a strip of material of a tenacious nature provided with tongues uniformly projecting from opposite edges thereof, a series of metallic plates secured to said tongues, said plates terminating in hooks which lie within the recess between the rim and the tire on each side of said tire, said hooks having their open sides lying outwardly, tightening-rings engaging said hooks on each side of the tire, and means on said rings for contracting them to uniformly tighten the protective tread around the tire.

In testimony whereof I affix my signature in presence of two witnesses.

JAMES M. SMALL.

Witnesses:
    R. J. MCCARTY
    C. M. THEOBALD.